(No Model.)
E. BROWN.
FLEXIBLE DOOR.
No. 532,021. Patented Jan. 8, 1895.
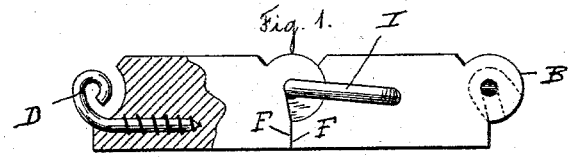
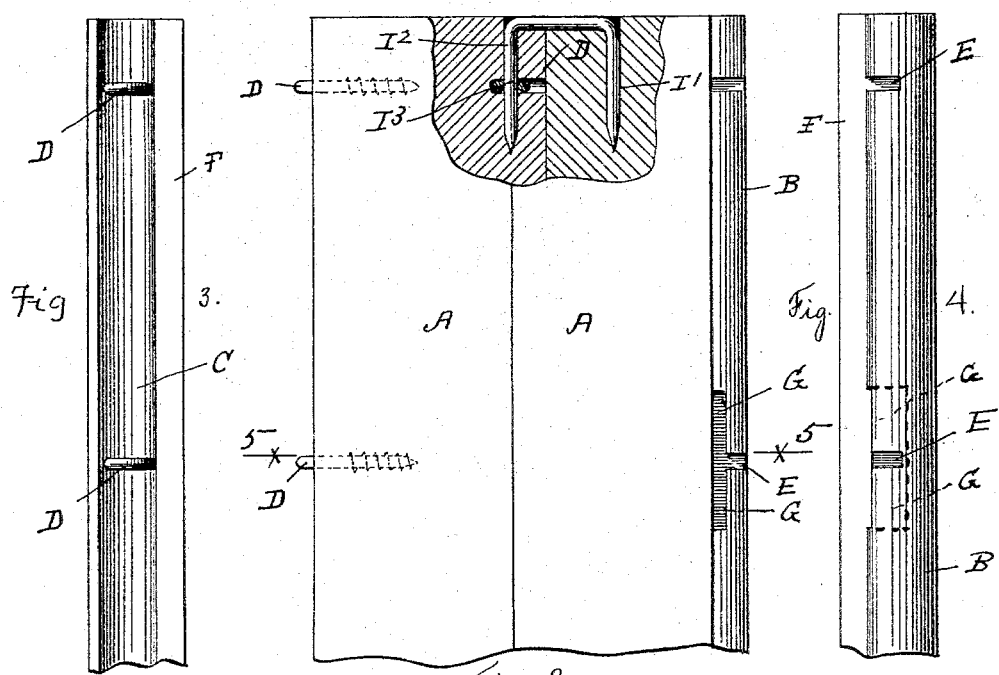
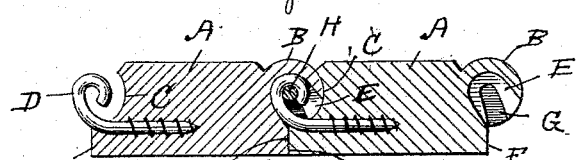
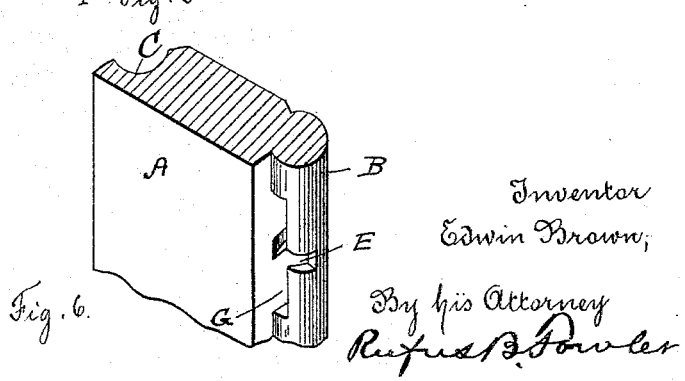
Witnesses
Chas. F. Schultz
Emma Hester
Inventor
Edwin Brown,
By his Attorney
Rufus B. Fowler

UNITED STATES PATENT OFFICE.

EDWIN BROWN, OF WORCESTER, MASSACHUSETTS, ASSIGNOR TO THE FLEXIBLE DOOR AND SHUTTER COMPANY, OF SAME PLACE AND PORTLAND, MAINE.

FLEXIBLE DOOR.

SPECIFICATION forming part of Letters Patent No. 532,021, dated January 8, 1895.

Application filed December 17, 1891. Serial No. 415,386. (No model.)

*To all whom it may concern:*

Be it known that I, EDWIN BROWN, a citizen of the United States, residing at Worcester, in the county of Worcester and State of Massachusetts, have invented a new and useful Improvement in Flexible Doors, of which the following is a specification, reference being had to the accompanying drawings, representing a portion of a flexible door embodying my invention, and in which—

Figure 1 represents in end view two of the strips or leaves forming a flexible door, one of said leaves being shown partly in sectional view. Fig. 2 represents a side elevation of a portion of two strips or leaves hinged together, a part of the same having been removed in order to show the connecting staple at the ends of the leaves. Fig. 3 denotes the concave edge of one of the leaves. Fig. 4 denotes the convex edge of the leaf. Fig. 5 denotes a sectional view on line 5, 5, Fig. 2, and Fig. 6 denotes a portion of one of the leaves shown in perspective view and representing the notched barrel by which the pintle is held.

Similar letters refer to similar parts in the several figures.

My invention relates to that class of flexible doors or shutters which consists of a series of parallel bars or leaves hinged together at their edges and it consists in the features of construction by which the strips or leaves forming the body of the flexible door are hinged together. The leaves are provided with concave and convex edges, one edge of each leaf being convex forming a barrel B, in which the pintles are held and the opposite edge of the leaf being concave as at C, the concave edge receiving and being concentric with the convex edge of the barrel B adjacent the leaf, so that when the concave edge C and convex barrel B are brought together as represented in end view in Fig. 1 and in sectional view in Fig. 5 they form an articulated joint. Inserted in the leaves A and projecting from their concave edges C are a series of hooks or eyes D which are received into notches E formed in the barrels B.

The leaves A, A, are provided with shoulders F, which abut when the door is extended bringing the leaves or strips A into the same plane and upon the side of the barrels next the shoulders F, F, are cut short grooves G extending upon either side of the notches E in order to receive a short wire H forming the pintle, which is inclosed by the hooks D. In order to attach the separate leaves together and hinge them by means of the hooks or eyes D and the wires H, I insert the projecting hooks D with the wires H within the hooks in the notches E and grooves G; the hook lying in the notch E and the wire H standing vertically within the groove G and forming the pintle about which the hook rotates.

The ends of the strips or leaves A, I prefer to unite by staples I having one leg I' driven into the leaf and the opposite leg I² entering the end of one of the barrels B concentrically to the barrel and extending through one of the hooks or eyes as represented at I³, Fig. 2.

I do not herein claim the use of staples for uniting the ends of the strips, or leaves, as such were shown and claimed by me in my pending application, Serial No. 413,254.

While I deem it advisable to insert the hooks or eyes D into the leaves A upon one side of a plane containing the pintles H as represented in sectional view in Fig. 5, I do not limit myself to such a construction, as the specific construction described can obviously be departed from without departing from the scope of my present invention.

When the pintles H are inserted in the grooves G and the leaves hinged together, in the manner described, the grooves G may be filled with strips of wood forming a concentric longitudinal chamber within the barrels.

What I claim as my invention, and desire to secure by Letters Patent, is—

1. In a flexible door, the combination of a series of parallel strips or leaves provided with concave and convex edges on their opposite sides said edges fitting each other and forming an articulated joint between said leaves, pintles inserted concentrically in said convex edges and hooks inserted in said concave edges and entering the convex edges and inclosing said pintles by which said leaves are hinged together, substantially as described.

2. In a flexible door, the combinotion with a leaf having a convex edge provided with a groove to receive a pintle, a pintle held in said groove and concentrically with the convex edge, a leaf provided with a concave edge fitting said convex edge and hooks held in said concave edge and inclosing said pintles, substantially as described.

3. In a flexible door, the combination of leaves A, A, having convex edges B forming the barrels of the hinged joints between said leaves, grooves G in said barrels, notches E communicating with said grooves, pintles H held in said grooves concentrically with the barrels B and hooks D held in the edges of adjacent leaves and inclosing said pintles, whereby said leaves are hinged together, substantially as described.

Dated at Worcester, in the county of Worcester and State of Massachusetts, this 24th day of November, 1891.

EDWIN BROWN.

Witnesses:
RUFUS B. FOWLER,
EMMA KESTER.